US007913915B2

(12) United States Patent
Castañeda

(10) Patent No.: US 7,913,915 B2

(45) Date of Patent: Mar. 29, 2011

(54) TOKEN WITH STRUCTURE TO PREVENT DAMAGE DURING MOLDING

(75) Inventor: Heriberto Corrales Castañeda, Col. Residencias (MX)

(73) Assignee: Gaming Partners International USA, Inc., Las Vegas, NV (US)

( * ) Notice: Subject to any disclaimer, the term of this patent is extended or adjusted under 35 U.S.C. 154(b) by 1495 days.

(21) Appl. No.: 11/269,759

(22) Filed: Nov. 9, 2005

(65) Prior Publication Data

US 2007/0102526 A1 May 10, 2007

(51) Int. Cl.
*G06K 19/05* (2006.01)

(52) U.S. Cl. ........................................ 235/492; 235/487

(58) Field of Classification Search .................. 235/492, 235/487, 451, 493; 425/116, 117
See application file for complete search history.

(56) References Cited

U.S. PATENT DOCUMENTS

| | | | | |
|---|---|---|---|---|
| 3,439,439 | A * | 4/1969 | Stimson | 40/1.5 |
| 3,670,524 | A * | 6/1972 | Korwin | 63/18 |
| 3,926,291 | A * | 12/1975 | Burke et al. | 194/213 |
| 4,818,855 | A * | 4/1989 | Mongeon et al. | 235/440 |
| 5,690,773 | A * | 11/1997 | Fidalgo et al. | 156/267 |
| 6,021,949 | A * | 2/2000 | Boiron | 235/492 |
| 6,206,291 | B1 * | 3/2001 | Droz | 235/488 |
| 6,264,109 | B1 * | 7/2001 | Chapet et al. | 235/492 |
| 6,352,261 | B1 * | 3/2002 | Brown | 273/288 |
| 6,581,747 | B1 | 6/2003 | Charlier et al. | |
| 2002/0006829 | A1 | 1/2002 | Purton | |

OTHER PUBLICATIONS

U.S. Appl. No. 11/269,758, filed Nov. 9, 2005.
U.S. Appl. No. 11/269,757, filed Nov. 9, 2005.
U.S. Appl. No. 11/269,759, filed Nov. 9, 2005.

* cited by examiner

*Primary Examiner* — Daniel St. Cyr

(74) *Attorney, Agent, or Firm* — Brownstein Hyatt Farber Schreck, LLP

(57) ABSTRACT

A token and method and apparatus for making the token, wherein the token includes a flat body made of a plastic material. The flat body has at least two parallel faces and a cavity which opens to at least one of the at least two parallel faces. The edges of the body include edge spots of a separate plastic material. The cavity receives an electronic identification device. At least one cover made of a plastic material is included. The method includes making the flat body, in two basic steps. First, by forming a pre-molded slug having a cavity and a lip extending above and around the periphery of the cavity using upper and lower dies. Next the slug is assembled with other components including an electronic identifier disc and a cover. In the final forming stage, the assembly is pressed using plates or dies to deform and flatten the lip to join the components by the flowing plastic of the lip and the cover, and compress the assembled components to the final thickness desired for the token. The process utilizing the pre-mold slug with a lip avoids excess plastic material flowing outwardly to obscure the edge spots, while preventing damage to the electronic identifier.

6 Claims, 2 Drawing Sheets

TOKEN WITH STRUCTURE TO PREVENT DAMAGE DURING MOLDING

BACKGROUND OF THE INVENTION

1. Field of the Invention

This invention generally concerns gaming tokens such as disks, flat plaques, or cards, which integrate an electronic chip or an electronic identification device. The applications for the present invention are to be found, amongst others, in the contactless identification or electronic labeling of persons and objects, and in the authentication, identification tracking and counting of gaming tokens, also called casino chips. The expression "gaming token" covers any token that can be used in a gaming room and representing a value that is predetermined or not. Gaming tokens are usually molded from a rigid plastic material to obtain a structure that is solid enough to resist conditions of use in casinos. The plastic token may include edge spots defined by plastic pieces of various colors embedded around the periphery. The term "token" is used herein to refer to any flat body that may include an electronic circuit.

2. Discussion of Background Information

U.S. Pat. No. 6,021,949, commonly owned with the present application, the entire disclosure of which is hereby expressly incorporated by reference, describes a gaming token or plaque, the body of which integrates an electronic chip made from laminated sheets of rolled plastic material. The electronic chip or electronic identifier includes an electronic circuit with a memory bearing identification and/or coding information concerning the person or object associated with the token (electronic label) or the token itself (gaming token or payment token). The electronic circuit is generally associated with an emitter-receiver connected to an antenna and adapted to be supplied by inductive coupling. The electronic chip is placed in the center of an opening provided in the body of the token, protected and held on either side by two rigid wafers and finally joined together and integrated into the body of the plaque by a lamination of top sheets of transparent cellulose acetate followed by the thermoforming of the assembly.

The manufacturing process for the body of the plaque incorporating the electronic chip by laminating thin sheets of plastic material described in the above mentioned patent was well adapted to highly decorated plaques and those representing a high nominal value, usually manufactured in small or medium sized series. However, protection of the electronic chip when integrated into the body of the plaque required a certain thickness, usually between 4 and 6 mm. Gaming tokens or plaques with a thickness of about 3 mm and equipped with an electronic chip were difficult to manufacture using this method, with an excessive number of rejects resulting from the destruction of the chip.

To facilitate the manufacture of thinner game tokens, commonly assigned U.S. Pat. No. 6,581,747, the entire disclosure of which is hereby expressly incorporated by reference, discloses a gaming token made of plastic with a cavity in which an electronic identification device is placed. The electronic device includes an emitter-receiver and a peripheral antenna placed between two thin plastic films joined along their peripheries to form a protective envelope or pellet. The cavity offers at least one face opening closed by a plastic plug inserted into the cavity and assembled directly with the flat body, retaining the electronic device therein.

This structural arrangement made the token very robust while reducing its thickness by eliminating any superfluous layer of plastic. The deformation capacity of the plug ensured a very robust weld, and a good cohesion between the token body and the thus completed electronic identifier.

However, the electronic device utilized in the above-mentioned prior art, was small, incorporating components capable of operating with only a relatively low frequency. To accommodate higher frequencies, a larger diameter, electronic pellet was necessary. The increased size was found to be accompanied by an increased incidence of breakage of the pellet envelope. Because the electronic pellet was heterogonous rather than homogeneous, stresses from the deforming plastic plug were concentrated at certain points of the envelope, causing the plastic film to break. Also, there was no direct interconnection between the upper and lower surfaces of the token, weakening the structure. Thus, the manufacturing process was accompanied by a high number of rejected defective tokens.

To lessen the damage and the number of defects, a token was developed which provided a recess in the body of the token to accommodate the circuitry of the electronic identifier and through holes were placed in the pellet envelope. The through holes allowed plastic to flow through and interlock the top and bottom of the token, while the recess accommodated the different thicknesses of the electronic identifier components. This inventive effort is the subject of commonly assigned U.S. Provisional application 60/686,419, filed Jun. 2, 2005.

Although the tokens of the prior art produced robust tokens and addressed the concerns of damage to the electronic identifier, the edge spots, in tokens so equipped, were found to be deformed and diffused by excess plastic material flowing across the surface of the token in the final molding press operation. The final molding required a relatively high level of compression, which also subjected the electronic identifier to an increased chance of being damaged.

SUMMARY OF THE INVENTION

According to the present invention, there is a reduction in the incidence of breakage of the electronic identifiers, and obscuring of the edge spots is avoided. Thus, a robust chip with clear edge spots and a lesser number of manufacturing rejects is obtained.

Towards this end, the token is made from a basic slug which is assembled with edge spots and pre-molded under compression to provide a body which includes the necessary cavities for electronic identifiers and other inlays. A final, minimal molding joins all the components without displacing an excess amount of plastic material. The pre-molded slug includes a small lip surrounding the cavity for the identifier which, in the final compression molding flows over and fuses the components within the cavity, yet does not expand outwardly so as to obscure the edge spots and create an excess amount of flash which must later be trimmed.

The two step molding operation achieves up to 95% of the compression in a pre-molding operation, leaving minimal, approximately 5%, of the molding for the final joining process. The basic slug and its edge spots are placed in a pre-molding die which, upon the application of pressure and heat, causes the initial and greater compression of the token. The die is specifically designed to form a lip of plastic around the circumference of a cavity in the token. The particular design of the lip, its size, and shape, can be varied. An electronic identifier, a cover and a final label or decal are then placed in the cavity. The second compression molding step joins all the components together, deforming the lip to partially overly and fuse the plastic of the components in the cavity. The final finishing operation trims away any excess plastic that has passed out of the mold as flash.

Preferably, the electronic identification device is incorporated in a disc including an electronic circuit having a memory containing information concerning the token. The token body includes either a through hole or a cavity that provides a housing. Preferably, the electronic identification device and the protective enclosure are in the form of a flat disc with a smaller diameter than the diameter of the housing hole or cavity in which it is received.

In one embodiment of the invention, the token includes a cavity extending from one surface into, but not through, the body. The electronic identifier is placed on the stepped bottom of the cavity and overlaid with a plug, or cover. Completing the assembly, decals or labels containing indicia, are placed over the cover and beneath the token body. All the components of the token are then fused or welded together in a thermo-compression process.

Whereas a component of the electronic circuit within the identifier might have greater thickness, the bottom of the cavity or housing can include a recess to accommodate this component without damage during the thermo-compression process.

The body and the plug are made of either the same or different thermoplastic material, showing a vitreous transition temperature of between 40 degrees C. and 130 degrees C., preferably between 50 degrees C. and 100 degrees C.

Various embodiments of the invention use bodies and plugs of thermoplastic material. The bodies and plugs are each made of a thermoplastic material belonging to one of the following families:

the styrenes and their copolymers, in particular PBS and ABS, the methacrylics, in particular PMMA, the vinyls in particular PVC and their copolymers, the celluloses, in particular cellulose acetate, the saturated polyesters, in particular PBT and the polyolefins, in particular PE hd and their copolymers.

According to yet another embodiment of the invention, the body and the plug are made of identical or different thermosetting plastic, namely a material belonging to the family of non-saturated polyesters.

As an alternative, the body and the plug for the two embodiments of the invention presented above are made of plastic materials having the same basic polymer so as to facilitate the welding between the body and the plug, or of plastic material compatible with welding.

The invention also concerns a method of manufacturing a gaming token or plaque or similar device, hereinafter called token, with a thermoplastic body, including manufacturing the thermoplastic body by groups or by unit, making a cavity in the body having at least one face opening, placing in the cavity the electronic identification device and inserting a plug or lid in each face opening, closing the cavity by welding of the plugs with the token body previously heated, in particular and around the area of each opening by applying pressure to the heated areas, and at least one of cutting of the contour of the token body and finishing of the edge of the token.

The invention also concerns a method of manufacturing a gaming token or plaque or similar device, hereinafter called token, with a thermosetting body, including manufacturing a preform of the token body in a thermosetting plastic material, making a cavity in the preform having at least one face opening, placing the electronic identification device in the cavity and inserting a plug in each face opening, placing the whole preform of the token body equipped with the electronic identification device and plugs into a mold, making the token body by thermocompression of the preform and closing the cavity in the token body.

In either of the methods described above, decals or labels having indicia can be placed on both faces of the token body.

According to another aspect of the invention, a token having a flat plastic body includes an upper and lower face and a cavity formed in at least one face of the body, the cavity including a peripheral edge with a raised lip extending above the one face, an electronic identifier within the cavity and a plastic plug covering the identifier, wherein the components of the assembly are adapted to be joined by compression and deformation and fusion of the plastic materials. The body includes openings around an outer edge of the body and extending inwardly and edge spots defined by separate distinct pieces arrayed around the outer edge of the body within the openings. A thin label or decal is layered over the cover and over the other, lower, surface of the body. The labels or decals may include indicia. The electronic identifier may be embodied as a disc containing a circuit and may include an antenna, battery and an emitter-receiver. The lip of the invention may be generally triangular in shape including a generally vertical leg at the edge of the cavity and a leg that extends downwardly and outwardly.

According to a further aspect of the invention, an apparatus used for making the pre-molded slug comprises an upper die having a body and a lower surface with a generally circular die recess extending upwardly from the lower surface into the body of the die, the die recess being defined by at least one generally vertically extending wall which corresponds in shape to at least one outer wall of the flat body. The die recess includes a generally planar inside top face with a downwardly extending generally cylindrical boss corresponding in shape to the shape of the cavity, and intersecting the upper die body adjacent the inside top face. At this intersection, a lip recess is provided extending upwardly. The boss includes an outwardly extending step adjacent its intersection with the upper die body to form a ledge surrounding the cavity. In conjunction with the upper die, a lower die having its own recess and boss forms a lower cavity in the pre-molded slug body.

The invention also concerns a method of making a token, which includes providing a basic slug of plastic material having the general shape of the gaming token and pre-molding the basic slug to provide a pre-molded slug with a cavity and a lip. Next, the pre-molded slug is assembled with an electronic identifier cover and labels or decals and further molded using pressure and heat to compress the lip, the cover and the pre-molded slug so as to fuse the plastic components and embed the electronic identifier while forming the flat planar surfaces of the token. In a final stage, any flash exuding from the forming process is removed from the edge of the token.

The invention is not limited to gaming tokens and plaques, but also concerns similar devices equipped with an electronic chip and having similar shapes and structures, in particular fixed amount prepaid tokens and electronic payment tokens, electronic labels, plaques or electronic identification cards. Furthermore, electronic identification may sometimes be limited to a simple authentication of the electronic chip, i.e., recognition of the presence of the chip by an associated contactless reader (radio-frequency reader also called RFID reader) for electronic transaction (read and/or write).

Other objects, characteristics and advantages of the present invention will be apparent on reading the following description of various embodiments of the invention, including methods of manufacturing thereof, which are given as non-restricting examples in reference to the attached drawings.

BRIEF DESCRIPTION OF THE DRAWINGS

The tokens illustrated in the drawings are shown to a scale that may be larger in thickness to facilitate an understanding of the drawings. The present invention is further described in the detailed description which follows, in reference to the noted plurality of drawings by way of non-limiting examples of embodiments of the present invention, in which like reference numerals represent similar parts throughout the several views of the drawings, and wherein.

DETAILED DESCRIPTION OF THE PRESENT INVENTION

Figure 1:
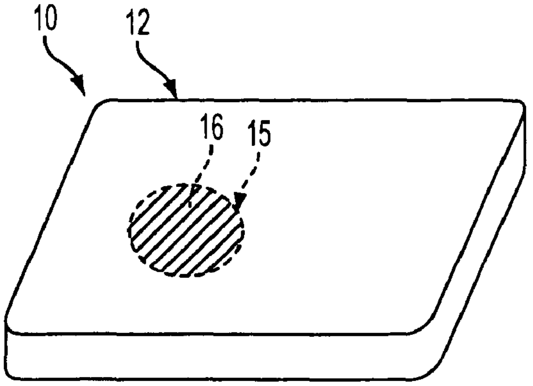
FIG. 1 shows a perspective view of a generalized gaming token made of thermoplastic material with a through hole.

As shown in FIG. 1, the token 10 can be of any general shape and various contours, including rectangular (as illustrated) or circular or elliptical. The tokens include a flat body 12 and an embedded, integrated electronic identifier 16 within a cavity 15.

Figure 2:
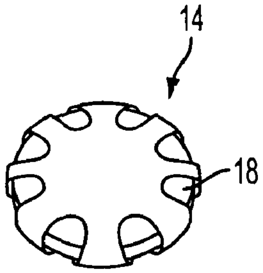
FIG. 2 is a perspective view of an assembled slug, prior to molding, of an embodiment of the invention.
Figure 3:
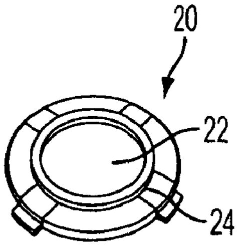
FIG. 3 is a perspective view of the pre-molded slug.

In one embodiment of the invention, the gaming token or chip is circular, and is assembled from a plastic slug and other labels, decals and covers. FIG. 2 shows an assembled slug 14 with edge spots 18 inserted in openings around the periphery. The edge spots are typically of different colors and may denote different values of the chip. The assembled slug and edge spots are molded under heat and pressure in a steel die to form the pre-molded slug 20 shown in FIG. 3. The pre-molded slug includes a cavity 22 that extends to the upper surface of the chip. A lip 24 passes around the periphery of the cavity and extends above the plane of the slug's upper surface.

Figure 4:
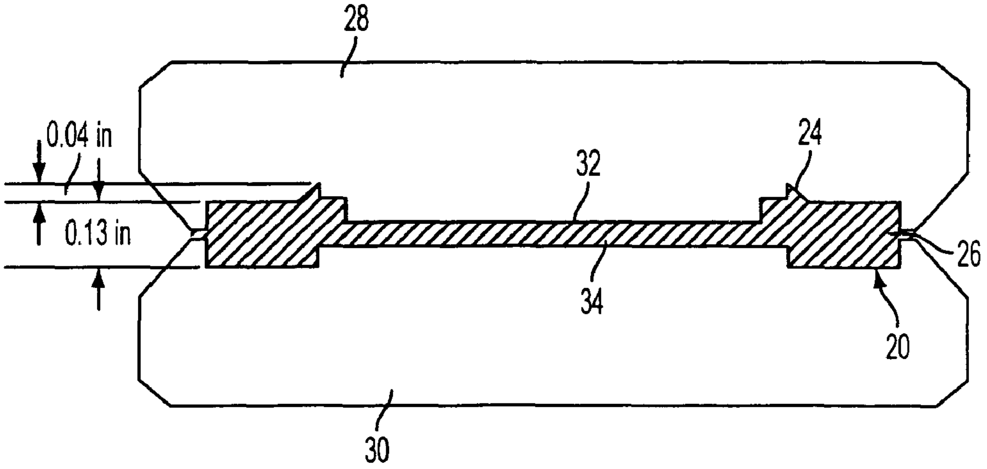
FIG. 4 is a cross sectional view of the pre-molded slug assembly within the pre-mold dies.

The structure and shape of the pre-molded slug is best shown in FIG. 4. In a specific example, the slug body 26 has a thickness of approximately 0.132 inches. The lip 24 extends around 0.040 inches above the body. The slug is formed by upper die 28 and lower die 30, the dies being preferably made from steel, and have a shape corresponding to the final desired shape of the pre-molded slug to provide the lip as well as upper and lower cavities 32 and 34, respectively, to receive the other components of the chip.

As shown in FIG. 4, the lip 24 is triangular, predisposing the flow of plastic material on final compression toward the center of the token. However, other shapes for the lip may be used.

The upper face of the cavity may be formed with recesses to accommodate the thicker elements of the identification device. The cavity 15 has a cylindrical shape with a diameter slightly greater, by a few millimeters, than the identifier disc, thus avoiding premature damage to the electronics when the disc is placed in the cavity. Furthermore, without going beyond the scope of the invention, cavities with various sections (e.g., rectangular) can be used to house electronic identifiers that have matching contours (e.g., rectangular).

Figure 5:
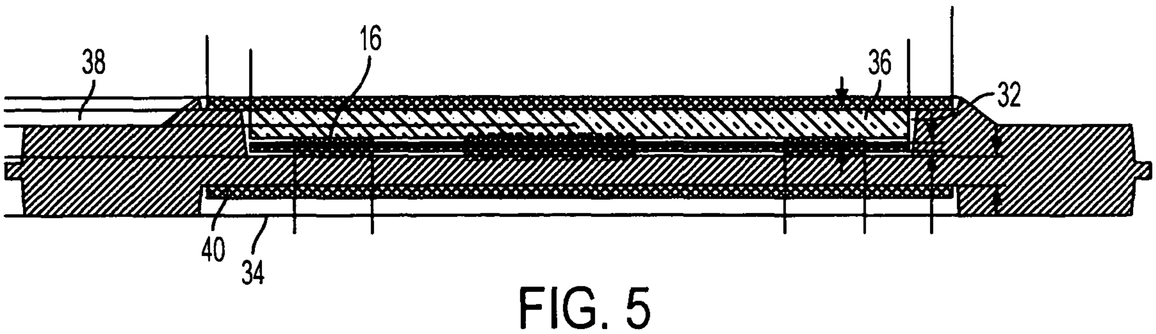
FIG. 5 shows a longitudinal sectional view in a plane perpendicular to the token of the assembled pre-molded slug prior to its final molding.

The slug is an intermediate product in the method of making the final chip. Next, the slug is assembled with its separate components as shown in FIG. 5. The electronic identification device 16, formed as a disc and including the emitter-receiver and a peripheral antenna, is placed within the upper cavity. Details of the electronic identifier can be ascertained from the above-mentioned commonly assigned U.S. Pat. Nos. 6,021,949 and 6,581,747. Also, the electronic device might be incorporated in a perforated disc to enable the flow of the plastic material through the disc during the final pressing operation.

To continue the assembly of components, a plug or cover 36 is placed on top of the electronic disc, followed by label or decal 38. Completing the assembly, a similar label or decal 40 is placed in the lower cavity. The plug or cover 36 is preferably made of PVC and when inserted in the cavity, may be softened or pasty, to better deform during the later compression stage. The cover 36 has a contour that matches that of the cavity 15, e.g. a circular contour. A label or decal 38 is placed on top of the cover 36. A similar label or decal is placed in the lower cavity. In a preferred embodiment, the label or decal is made of TESLIN paper.

Figure 6:
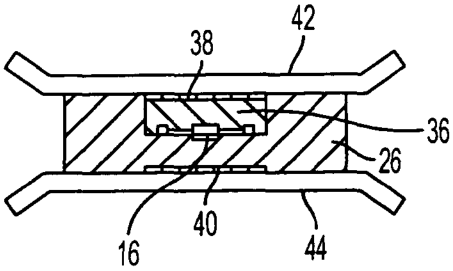
FIG. 6 is a cross-sectional view of the final compression of the assembled components.

The assembled slug and its components are now ready for the final step in the process. In the final compression step, as shown in FIG. 6, the assembly of the pre-molded slug and its identifier disc 16, cover 36 and labels or decals 38, 40, are placed between a final thermo-compression mold or between two dies or compression plates 42, 44, and is compressed such that the individual components are joined or welded together with the planar surface of the labels or decals 38, 40 assuming a final position in the same plane as the upper and lower faces of the token body. In this way, but for any final trimming operations, a finished token is produced with labels or decals having the appropriate indicia. Because of the minimal compression required at this point, and because only a small lip exists on the slug, a sufficient joining of the components is obtained without damage to the electronic disc and without excess flowing plastic obscuring or deforming the edge spots and being wasted as flash.

The controlled movement of the press or dies 42 and 44 enables the body of the plaque or token to be obtained directly at the required final thickness (for example 3 mm), the body in addition undergoing a slight optional reduction of its thickness (for example, approximately one millimeter).

In special situations, and in particular depending on the types of thermoplastic materials used for the bodies and plugs, the heating temperature is generally between 100 degrees C. and 160 degrees C., and the pressure applied is generally between 1 and 10 Mpa (10 to 100 bars). Furthermore, it may be preferable to start heating the body and/or plug before applying the pressure on the plugs and/or body.

The cover 36, under the combined action of the heat and the pressure applied by each plate, is deformed to become welded to the side wall of the cavity 15 and, most often, form fitting and interlocking undulations surfaces of the cavity are closed, the limit of the welding area disappearing (at least on the surface), when using identical or almost identical thermoplastic material of the same color for the cover 36 and the body of the plaque 26. Thus, the creation of a real mechanical interlocking between the cover and the cavity reinforces the weld joint.

Additionally, the plug or cover may deform and flow through the electronic identifier disc, if perforated, to secure the identifier and join the upper and lower faces of the token.

The body 12 and any covers may be made of the same thermoplastic material, in this case loaded between 50% and 70% with barite or barium sulphate, chosen from among one of the following polymer families:

the styrenes and their copolymers, namely polybutadienestyrene (PBS) and acrylonitrile-butadiene styrene (ABS), the methacrylics, namely polymethylmethacrylate (PMMA), the vinyls, namely polyvinyl chloride (PVC) and their copolymers, the celluloses, namely cellulose acetate, the saturated polyesters, namely polybutyleneterphtalate (PBT), and the polyolefines, namely high density polyethylene (PE hd) and their copolymers. In a preferred embodiment the basic material is PVC with zinc oxide and titanium.

Good joints between the components can also be obtained by using for the body and covers, couples of different polymer based thermoplastic materials offering a good compatibility to be welded or fused together, for example the couples ABS/PMMA, ABS/PBT and PVC/PBT. In any case, the undulated mechanical interlocking at joint level reinforces the weld.

Figure 7:
FIG. 7 is a perspective view of a finished chip.

The manufacture of the plaque (or token) continues with the finishing of the edge, removing the flash as necessary, to result in the finished token or chip 48 shown in FIG. 7. As an option, it is possible to create a sunk decoration or a new hollow cavity (1 mm to 2 mm) by die stamping and/or the placing of a surface decoration on the faces of the plaque (or token), for example by pad printing, hot stamping or screen printing and heat bonding covering labels on the faces of the plaque (or token), etc.

The invention is not limited to the manner of heating and compression or thermo-compression described herein, but concerns the use of technically equivalent ways known to specialists. In particular, the expression "heating" is used in a broad sense and covers especially heating by electrical resistances, high frequency, microwave or infrared heating. Within the scope of the invention, it is also possible to physically separate the ways of heating from the ways of compression (plate press or dies). Finally, in certain variants of the invention, the plug(s) are preheated before being inserted into the cavity. It is also possible to preheat or to heat during final compression the whole body of the token or plaque. In the same way, the pressing ways can be limited in surface for the thermoplastic material or cover the whole face of the token or plaque for both thermoplastic material and thermosetting material, thus allowing a token or a plaque to be obtained with a good surface condition and a high quality visual appearance.

Of course, the description of this embodiment of the invention also applies to rectangular plaques and flat tokens or plaques with various contours, especially elliptic, as well as to plaques and tokens with through cavities closed by two plugs.

Thus, the invention described herein, makes it possible to obtain gaming plaques and tokens with electronic identifiers, or similar devices approximately 3 mm thick, of good quality and at a low cost, while lessening the chance of damage to the electronic identifier or a lack of structural strength of the assembled token parts which would lead to rejects in the manufacturing process. The present invention also protects the gaming plaques from optical interference generated by laser light.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A pre-molded slug adapted to be formed as an intermediate product in a method of making a plastic token, said slug comprising:

a body of plastic material having nominal upper and leer faces, wherein the upper and lower faces are joined by a generally vertically extending edge extending around an outer periphery of the body, said vertically extending edge including spaced openings extending inwardly and extending through the upper and lower faces;

a cavity formed within and extending to a surface of one of said faces;

a lip surrounding and extending above an upper edge of the cavity at the said one face; and edge spots of a separate plastic material received in said openings.

2. The slug of claim 1, wherein the lip is narrow and extends closely adjacent the edge of the cavity.

3. The slug of claim 1, wherein the said lip is triangular in cross-sectional shape.

4. The slug of claim 3, wherein the said triangular lip has a generally vertical leg at the edge of the said cavity and a leg that extends downwardly and outwardly.

5. A method of making a pre-molded slug as an intermediate product in making a gaming token, the method comprising:

providing a basic slug of plastic material having the general shape of the gaming token with upper and lower slug surfaces;

forming openings extending inwardly from an outer edge of said basic slug and extending between the upper and lower slug surfaces;

placing edge spots of separate plastic material within said openings;

pre-molding said basic slug to faun a pre-molded slug with upper and lower faces and having an internal cavity on at least one of said faces;

said pre-molding further including forming a lip extending away from said one face adjacent to and surrounding said cavity.

6. The method of making a pre-molded slug as in claim 5, wherein the pre-molding of said basic slug to form a pre-molded slug further comprises molding a second cavity on another of said faces.

* * * * *